(12) United States Patent
Wollitzer et al.

(10) Patent No.: US 11,258,153 B2
(45) Date of Patent: Feb. 22, 2022

(54) COUPLING AND DECOUPLING DEVICE BETWEEN A CIRCUIT CARRIER AND A WAVEGUIDE

(71) Applicant: Rosenberger Hochfrequenztechnik GmbH & Co. KG, Fridolfing (DE)

(72) Inventors: Michael Wollitzer, Fridolfing (DE); Thomas Reum, Bad Liebenstein (DE)

(73) Assignee: ROSENBERGER HOCHFREQUENZTECHNIK GMBH & Co. KG, Fridolfing (DE)

(*) Notice: Subject to any disclaimer, the term of this patent is extended or adjusted under 35 U.S.C. 154(b) by 75 days.

(21) Appl. No.: 16/759,744

(22) PCT Filed: Oct. 31, 2018

(86) PCT No.: PCT/EP2018/079844
§ 371 (c)(1),
(2) Date: Apr. 28, 2020

(87) PCT Pub. No.: WO2019/091846
PCT Pub. Date: May 16, 2019

(65) Prior Publication Data
US 2021/0167480 A1  Jun. 3, 2021

(30) Foreign Application Priority Data
Nov. 8, 2017  (DE) .................... 10 2017 126 112.5

(51) Int. Cl.
*H01Q 9/28* (2006.01)
*H01P 5/08* (2006.01)
*H02J 50/20* (2016.01)

(52) U.S. Cl.
CPC ............. *H01P 5/087* (2013.01); *H01Q 9/285* (2013.01); *H02J 50/20* (2016.02)

(58) Field of Classification Search
CPC ............ H02J 7/0013; H02J 9/061; H02J 9/068
See application file for complete search history.

(56) References Cited

U.S. PATENT DOCUMENTS 3,509,572 A * 4/1970 Barbano ............ H01Q 21/0037
                                                    343/792.5
3,740,754 A   6/1973 Epis
(Continued)

FOREIGN PATENT DOCUMENTS

AU    761339 B2    6/2003
CN    102246352 A  11/2011
(Continued)

OTHER PUBLICATIONS

Lehmensiek Robert, "A design methodology of the wideband orthogonal mode transducer for the SKA Band 2 feed", 2016 10th European Conference on Antennas and Propagation (EUCAP), European Association of Antennas and Propagation, (Apr. 10, 2016), doi:10.1109/EUCAP.2016.7481872, pp. 1-4, XP032906828.
(Continued)

*Primary Examiner* — Dinh T Le
(74) *Attorney, Agent, or Firm* — David P. Dickerson

(57) ABSTRACT

The invention relates to a coupling and decoupling device between a circuit carrier and a waveguide. The coupling and decoupling device contains a retaining element, which has a first end for coupling to the circuit carrier and a second end for coupling to the waveguide. Two dipole antennas, which are crossed over and oriented orthogonally to each other, are arranged between the first end and the second end. The coupling and decoupling device furthermore contains two conductor pairs, which are arranged crossed over each other and are designed such that the conductor pairs are connected to the two dipole antennas and to associated contact surfaces on the circuit carrier. According to the invention, an electrically conductive layer is fixed on the first end. The
(Continued)

Figure 1:
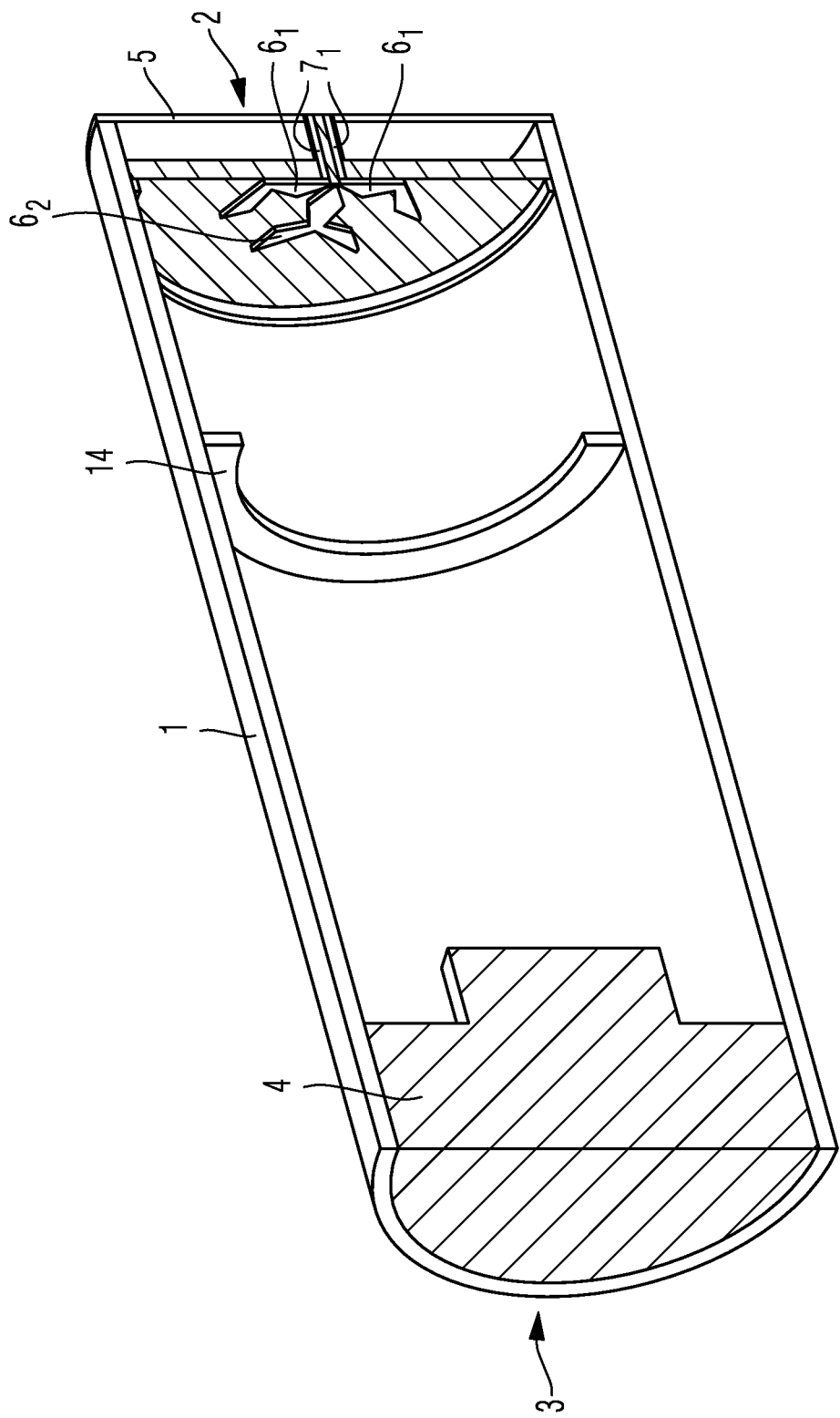

retaining element is formed as a hollow conductor having a first opening on the end face of the hollow conductor for coupling to the circuit carrier and a second opening on the end face of the hollow conductor for coupling to the waveguide. The first opening on the end face is closed by the electrically conductive layer.

20 Claims, 13 Drawing Sheets

(56) References Cited

U.S. PATENT DOCUMENTS

| | | | |
|---|---|---|---|
| 4,241,323 A | 12/1980 | Griffin et al. | |
| 4,516,133 A * | 5/1985 | Matsumoto | H01Q 9/16 343/819 |
| 8,736,396 B2 * | 5/2014 | Okada | H01P 1/161 333/21 A |
| 9,070,971 B2 * | 6/2015 | Johnston | H01Q 5/392 |
| 9,263,807 B2 * | 2/2016 | Gunnels | H01Q 9/16 |
| 9,287,903 B2 * | 3/2016 | Takeda | H01P 1/06 |
| 9,728,833 B2 | 8/2017 | Okada | |
| 2011/0260941 A1 | 10/2011 | Jones et al. | |
| 2011/0298682 A1 | 12/2011 | Plet et al. | |
| 2014/0174230 A1 | 6/2014 | Cannata | |
| 2016/0308266 A1 | 10/2016 | Hammerschmidt | |

FOREIGN PATENT DOCUMENTS

| | | |
|---|---|---|
| CN | 104155531 A | 11/2014 |
| CN | 205985361 U | 2/2017 |
| DE | 10035820 A1 | 1/2002 |
| JP | 2014-049785 A | 3/2014 |
| KR | 101788516 B1 | 10/2017 |
| WO | 2013/116249 A1 | 8/2013 |

OTHER PUBLICATIONS

Jae-Hoon Bang et al, "A New Dual Circularly Polarized Feed Employing a Dielectric Cylinder-Loaded Circular Waveguide Open End Fed by Crossed Dipoles", International Journal of Antennas and Propagation, (Jan 1, 2016), vol. 2016, doi:10.1155/2016/7570316, ISSN 1687-5869, pp. 1-7, XP055547597.

* cited by examiner

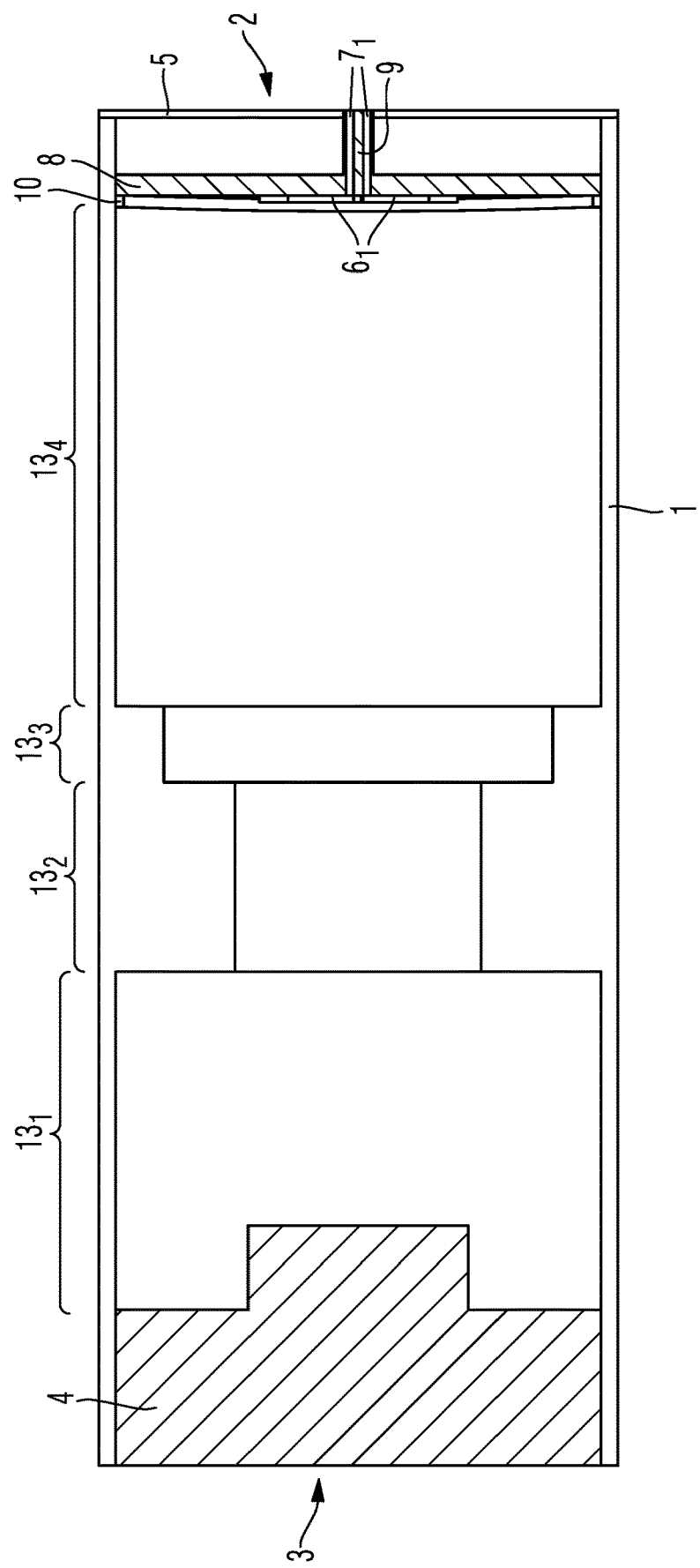

COUPLING AND DECOUPLING DEVICE BETWEEN A CIRCUIT CARRIER AND A WAVEGUIDE

FIELD OF THE INVENTION

The present invention relates to a coupling and decoupling device between a circuit carrier and a waveguide.

TECHNICAL BACKGROUND

For the transmission of an electromagnetic wave in a waveguide, preferably a dielectric waveguide, an elliptically polarized electromagnetic wave, preferably a circularly polarized electromagnetic wave, has technical advantages over a linearly polarized electromagnetic wave.

An elliptically polarized or a circularly polarized electromagnetic wave is preferably generated from a dual polarized electromagnetic wave, i.e. from two linearly polarized electromagnetic waves, the planes of polarization of which are respectively oriented orthogonally to one another.

A single linearly polarized electromagnetic wave is generated, as is evident from U.S. Pat. No. 9,728,833 B2, for example, from an associated radio-frequency signal which is fed to an antenna via a radio-frequency line and is radiated as an associated electromagnetic wave in the antenna. The radio-frequency signal is typically generated by means of radio-frequency electronics, preferably by means of a frequency oscillator, on a planar structure, i.e. either on a printed circuit board or on a substrate.

For feeding an elliptically or circularly polarized electromagnetic wave into or out of a waveguide, preferably into or out of a dielectric waveguide, with low outlay via an antenna arrangement with a high bandwidth and a high directional characteristic, no useful technical solution exists as yet.

This is a state that needs to be improved.

SUMMARY OF THE INVENTION

Against this background, the present invention is based on the object of specifying a coupling and decoupling device between a circuit carrier and a waveguide, preferably a dielectric waveguide, comprising an antenna arrangement for transmitting and receiving a dual polarized electromagnetic wave which has the highest possible bandwidth and a high directional characteristic.

This object is addressed by a coupling and decoupling device as taught, in various embodiments, in the present disclosure.

Accordingly, provision is made of:

A coupling and decoupling device between a circuit carrier and a waveguide comprising

- a holding element, which has a first end for coupling to the circuit carrier and a second end for coupling to the waveguide,
- two dipole antennas, which are arranged in a crossed manner and orthogonally with respect to one another between the first end and the second end, and
- two conductor pairs, which are arranged in a crossed manner with respect to one another and which are configured in such a way that they are connected to the two dipole antennas and to associated contact surfaces on the circuit carrier, wherein an electrically conductive layer is secured to the first end, wherein the holding element is a hollow waveguide, wherein the first end of the holding element is a first lateral opening of the hollow waveguide for coupling to the circuit carrier and the second end of the holding element is a second lateral opening of the hollow waveguide for coupling to the waveguide, wherein the first lateral opening is closed off by the electrically conductive layer.

The insight underlying the present invention consists in providing a holding element embodied as a hollow waveguide and having two ends, to which the circuit carrier and the waveguide are coupled. In this case, the first end is embodied as a first lateral opening of the hollow waveguide for coupling to the circuit carrier and the second end is embodied as a second lateral opening of the hollow waveguide for coupling to the waveguide. In addition, between the first and second ends of the holding element, i.e. between the first and second lateral openings of the hollow waveguide in the interior of the hollow waveguide, provision is made of an antenna arrangement composed of two dipole antennas, which are arranged in a crossed manner and orthogonally with respect to one another and thus transmit or receive a dual polarized electromagnetic wave. The signal transmission between the antenna arrangement and the circuit carrier is effected via two conductor pairs, which are arranged in a crossed manner with respect to one another and which are connected to the two dipole antennas and to associated contact surfaces on the circuit carrier. In addition, an electrically conductive layer is secured to the first end of the holding element and closes off the first lateral opening of the hollow waveguide.

Here and hereinafter a circuit carrier is understood to mean either a printed circuit board populated with components or devices appertaining to electronics, preferably radio-frequency electronics, or a substrate having integrated electronics, preferably having monolithically or hybrid integrated radio-frequency electronics.

Here and hereinafter a holding element is understood to mean an element to which the waveguide and the circuit carrier are secured at its two ends and the waveguide and the circuit carrier are thus spaced apart from one another. Secondly, the holding element serves for feeding at least one electromagnetic wave and an associated differential signal into and out of a transmission path situated between the two ends.

A hollow waveguide is a body which is embodied as hollow in the longitudinal direction and which either completely consists of an electrically conductive material or has an electrically conductive coating only on its inner casing surface. Preferably, the hollow waveguide has a hollow-cylindrical shaping with a circular cross-sectional profile. A square, rectangular, elliptic or any other suitable cross-sectional profile can also be present besides a circular cross-sectional profile. For each of these cross-sectional profiles, an arrangement of rod-shaped bodies running parallel and spaced apart from one another in the longitudinal direction of the hollow waveguide in the outer casing region can also be present instead of a solid and closed outer casing. These individual rod-shaped bodies are connected to one another in each case via connection regions at at least one location along their longitudinal extent. The distance between two respectively adjacent rod-shaped bodies should be chosen here in each case such that an electromagnetic wave of a specific wavelength is guided within the rod-shaped bodies.

Consequently, besides its securing function, the hollow waveguide advantageously carries out in addition the function of guiding an electromagnetic wave.

The waveguide coupled to the holding element embodied as a hollow waveguide at the second end of the holding element, i.e. at the second lateral opening of the hollow waveguide, is preferably embodied as a dielectric waveguide. Alternatively, the waveguide can also be embodied as a further hollow waveguide.

Each conductor pair composed of in each case two individual conductors transmits in each case a differential signal for symmetrical feeding in or out for the associated dipole antenna. The conductor pair is thus also understood to be a differential conductor pair. Each individual dipole antenna converts in each case between a linearly polarized electromagnetic wave and an associated hollow waveguide signal. On account of the orthogonal arrangement, the two dipole antennas in combination can transmit and receive either a dual polarized electromagnetic wave or at least one elliptically or circularly polarized electromagnetic wave.

The electrically conductive layer secured to the first end of the holding element and closing off the first lateral opening of the holding element embodied as a hollow waveguide results in total internal reflection of the electromagnetic wave emitted by the two dipole antennas in each case in the direction of the circuit carrier. The directional characteristic of the antenna arrangement composed of the two dipole antennas is advantageously improved in this way.

Besides optimizing the directional characteristic, the electrically conductive layer secured to the first end of the holding element additionally also contributes to increasing the bandwidth of the coupling and decoupling device:

Specifically, the electrically conductive layer together with the two dipole antennas forms in each case an additional capacitively acting geometry for the region of the transmission path which is situated between the two dipole antennas and the circuit carrier.

By means of a suitable arrangement of the individual dipole antennas in relation to the electrically conductive layer, the capacitively acting geometry of the coupling and decoupling device can thus be altered in a targeted manner. This alteration of the capacitively acting geometry produces a resonance at a specific resonant frequency. At this resonant frequency the impedance of the transmission path is approximately real and can thus be adapted to the impedance of the waveguide and of the circuit carrier. In this case, the transmission characteristic of the coupling and decoupling device at this resonant frequency has a further maximum. The bandwidth of the coupling and decoupling device is thus additionally increased by this resonant frequency according to the invention.

Advantageous configurations and developments are evident from the further dependent claims and also from the description with reference to the figures of the drawing.

It goes without saying that the features mentioned above and those yet to be explained below can be used not only in the combination respectively specified but also in other combinations or by themselves, without departing from the scope of the present invention.

In one preferred refinement of the invention, at least one dipole antenna is embodied in each case as a patch antenna. A patch antenna is understood to mean an antenna embodied in planar fashion, preferably an antenna embodied as a quadrilateral metal surface, the longitudinal side of which has a length amounting to half the wavelength of the transmitted or received electromagnetic wave.

In a further preferred refinement of the invention, at least one dipole antenna is embodied in each case as a fractal patch antenna. A fractal patch antenna is understood to mean a patch antenna in which each longitudinal side and/or each corner of the rectangular metal surface are/is modified in each iteration step in such a way that a quadrilateral metal surface is, in turn in each case, adjacent to each longitudinal side and/or to each corner of the quadrilateral metal surfaces respectively added in the last iteration step. The length of the longitudinal side of the newly adjacent quadrilateral metal surfaces is reduced by a specific factor in each case relative to the length of the longitudinal side of the quadrilateral metal surfaces newly produced in each case in the last iteration step. Said factor is dependent on the iteration method used and on the surface type used. In this way, such a fractal patch antenna, in each iteration step, additionally transmits and receives an electromagnetic wave whose wavelength is reduced by said factor relative to the wavelength of the electromagnetic wave newly transmitted and received by the fractal patch antenna in the last iteration step. The bandwidth of such a fractal patch antenna thus increases by said factor in each iteration step.

In one refinement of the coupling and decoupling device according to the invention, the distance between the two dipole antennas and the first end of the holding element is set depending on the frequency of the electromagnetic wave transmitted in the coupling and decoupling device. In one preferred refinement according to the invention, the distance I between the two dipole antennas and the first end of the holding element is then set optimally if it satisfies equation (1). In this case, n is an integral factor:

$$I = \lambda/4 + n \cdot \lambda/2 \qquad (1)$$

In this case, the electromagnetic waves emitted by the two dipole antennas in each case in the direction of the first end of the holding element are advantageously compensated for by the electromagnetic waves reflected in each case at the electrically conductive layer at the first end.

While in a first subvariant of the invention the two dipole antennas are situated freely in the coupling and decoupling device, in one preferred refinement of the invention both dipole antennas are applied on a carrier membrane. In this case, the carrier membrane is connected to the holding element in a region of the holding element which is adjacent to the first end. The two dipole antennas are arranged and secured on the carrier membrane either on a lateral surface of the carrier membrane directed toward the first end of the holding element or on a lateral surface of the carrier membrane directed toward the second end of the holding element. In this way, the two dipole antennas are advantageously mechanically stabilized in terms of their arrangement and orientation with respect to one another and also with respect to the two ends of the holding element.

In a second subvariant of the invention, for the purpose of axially fixing the carrier membrane to the hollow waveguide on an inner casing surface of the hollow waveguide in a region of the hollow waveguide which is adjacent to the first lateral opening at least one web is shaped in such a way that the carrier membrane butts against the latter. The requisite contact pressure exerted on the at least one web by the carrier membrane is effected by way of the connections hollow waveguide—circuit carrier—conductor pairs—dipole antennas—carrier membrane.

In the second subvariant of the invention, the two dipole antennas can be arranged and secured either on the lateral surface of the carrier membrane directed toward the first lateral opening or on the lateral surface of said carrier membrane directed toward the second lateral opening.

In a third subvariant of the invention, the carrier membrane is clamped in a depression in the hollow waveguide. In the third subvariant of the invention, the two dipole antennas are arranged and secured on the lateral surface directed toward the first lateral opening. Moreover, in the third subvariant, the carrier membrane is embodied in rigid fashion. In the third subvariant, each conductor pair presses against the two antenna arms of the associated dipole antenna in order to obtain a sufficient electrical and mechanical contact with the associated dipole antenna.

In a fourth subvariant of the invention, a special form of the third subvariant, the carrier membrane is embodied in elastic fashion. In the fourth subvariant of the invention, the conductor pairs press onto the antenna regions of the associated dipole antenna in such a way that, firstly, a sufficient electrical and mechanical contact with the associated dipole antenna is ensured. In addition, the pressing of the conductor pairs on the associated dipole antennas brings about a concave shaping, preferably a trough-shaped shaping, of the carrier membrane clamped in the hollow waveguide within the hollow waveguide, preferably in the region of the two dipole antennas. Here and hereinafter a trough-shaped shaping is understood to mean a concave shaping having a concavity corresponding to the shape of a trough within the hollow waveguide, preferably in the region of the two dipole antennas.

Besides the configuration according to the invention in which the two conductor pairs, in the region between the two associated dipole antennas and the first lateral opening of the hollow waveguide, are surrounded solely by the air situated in the hollow waveguide, the invention concomitantly covers a further configuration, too, in which the two conductor pairs are led in a signal line composed of a dielectric material.

The depression in which the carrier membrane is respectively clamped in the third and fourth subvariants has a lateral extent and a width corresponding to the thickness of the carrier membrane. The two lateral sides of the depression together with the dielectric material of the carrier membrane thus form a capacitively acting geometry for an electromagnetic wave emitted radially in each case by the two dipole antennas. The extent of the lateral sides of the depression forms an inductively acting geometry for an electromagnetic wave emitted radially in each case by the two dipole antennas.

According to the invention, a reflection-minimized transmission characteristic of the coupling and decoupling device at an associated resonant frequency is set depending on a depth of the depression, a thickness of the carrier membrane and a relative permittivity of a dielectric material used for the carrier membrane.

In a further embodiment of the coupling and decoupling device according to the invention, which is referred to hereinafter as the second embodiment, as a further technical measure according to the invention for increasing the bandwidth of the dual polarized electromagnetic wave there are embodied a plurality of axially successive regions of the hollow waveguide between the second lateral opening and the two dipole antennas in each case with an associated inner diameter, preferably a different inner diameter, and an associated axial extent, preferably a different axial extent.

By means of a corresponding design of the inner diameter and of the axial extent of each region, according to the invention the capacitively and inductively acting geometry of the hollow waveguide can be changed in said region. In this way, individual resonances with an associated resonant frequency can likewise be realized in the hollow waveguide. Consequently, the capacitively and inductively acting geometry of the hollow waveguide has for each region in each case a further maximum of the transmission characteristic at the associated resonant frequency. Consequently, according to the invention, the bandwidth of the coupling and decoupling device is additionally increased by these resonant frequencies.

In a third embodiment of the coupling and decoupling device according to the invention, in the region between the two dipole antennas and the second lateral opening of the hollow waveguide on the inner casing surface of the hollow waveguide provision is made of at least one stop directed inward. A partial reflection of the electromagnetic wave emitted in each case by the two dipole antennas in the direction of the second lateral opening of the hollow waveguide is effected in each case at each stop. Each stop preferably has in each case a different distance with respect to the two dipole antennas, a different longitudinal extent and a different transverse extent. In this case, the transverse extent of each individual stop preferably increases with increasing distance from the two dipole antennas.

By comparison with the acting geometry of the original hollow waveguide region between the two dipole antennas and the second lateral opening, each stop in each case alters the capacitively acting geometry in this hollow waveguide section by virtue of the associated transverse extent and longitudinal extent of said stop and the inductively acting geometry in this hollow waveguide section by virtue of the associated axial distance between said stop and the nearest discontinuity in the hollow waveguide—i.e. the most closely located stop or the two dipole antennas. By means of a suitable geometric arrangement and a suitable design of each individual stop, it is thus possible to generate in each case an associated resonance behavior of the associated resonant frequency in the respective hollow waveguide section. In this way, the acting geometry of the hollow waveguide at each resonant frequency has in each case a further maximum in the transmission characteristic. Consequently, according to the invention, the bandwidth of the hollow waveguide is increased by these additional resonant frequencies.

In a fourth embodiment of the coupling and decoupling device according to the invention, at least one electrically conductive element, preferably at least one metallized element, is arranged in the region between the two dipole antennas and the second lateral opening of the hollow waveguide. The electrically conductive element can be a rotationally symmetrical element, for example a screw or a pin, or a parallelepipedal element, for example a plate or a lamina, or any arbitrarily and suitably shaped element.

According to the invention, each electrically conductive element is designed in each case with regard to its arrangement and its geometry such that it realizes an associated filtering-acting geometry of the hollow waveguide for an electromagnetic wave to be transmitted between the first and second lateral openings.

Finally, in a further configuration of the invention, a component for conversion between at least one elliptically polarized electromagnetic wave and at least one linearly polarized electromagnetic wave is arranged in the hollow waveguide section between the second lateral opening and the two dipole antennas.

The above configurations and developments can be combined with one another in any desired way, in so far as is practical. Further possible configurations, developments and implementations of the invention also encompass not explicitly mentioned combinations of features of the invention described above or below in relation to the exemplary embodiments. In particular, here the person skilled in the art will also add individual aspects as improvements or supplementations to the respective basic form of the present invention.

INDICATION OF THE CONTENTS OF THE DRAWING

Figure 2A:
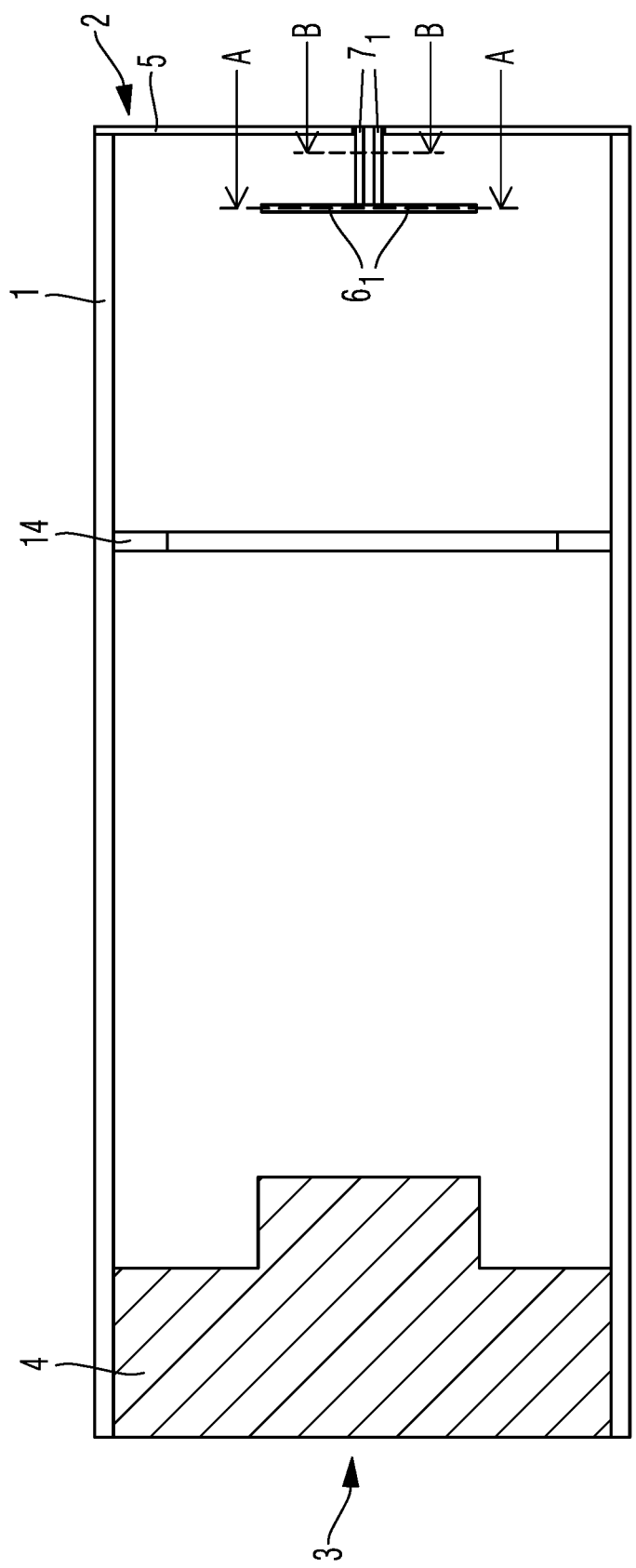
Figure 2B:
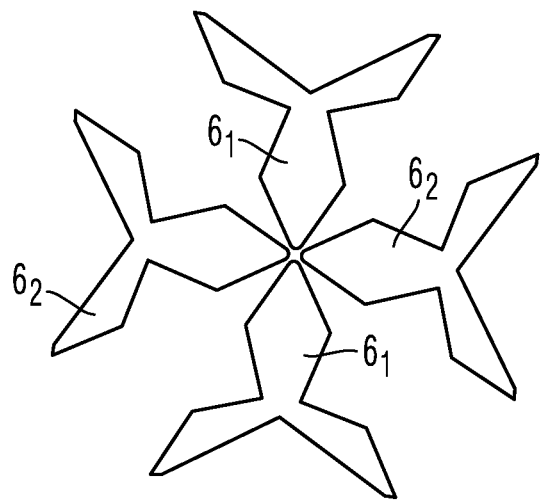
Figure 2C:
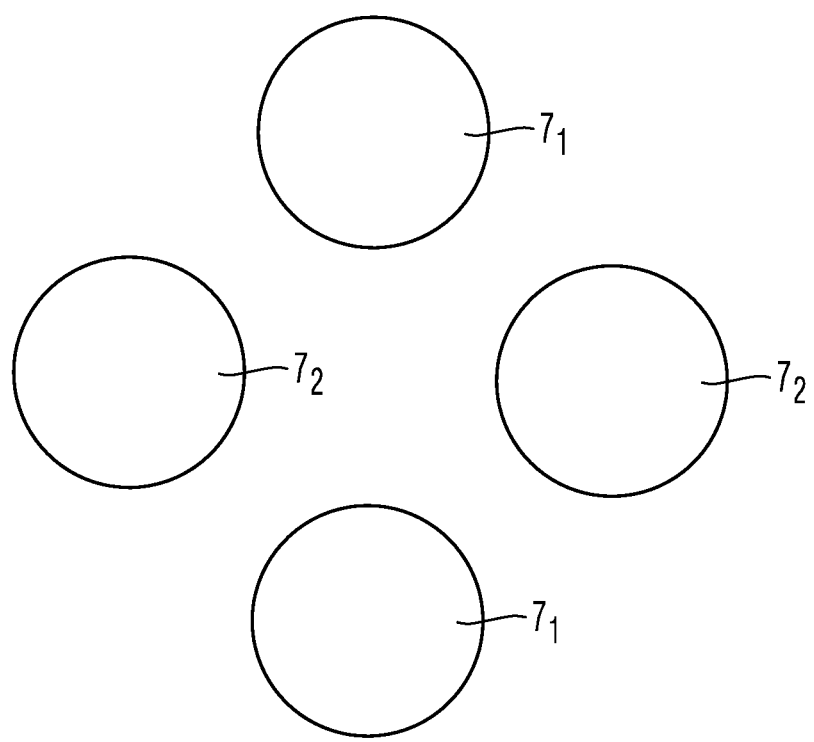
Figure 3A:
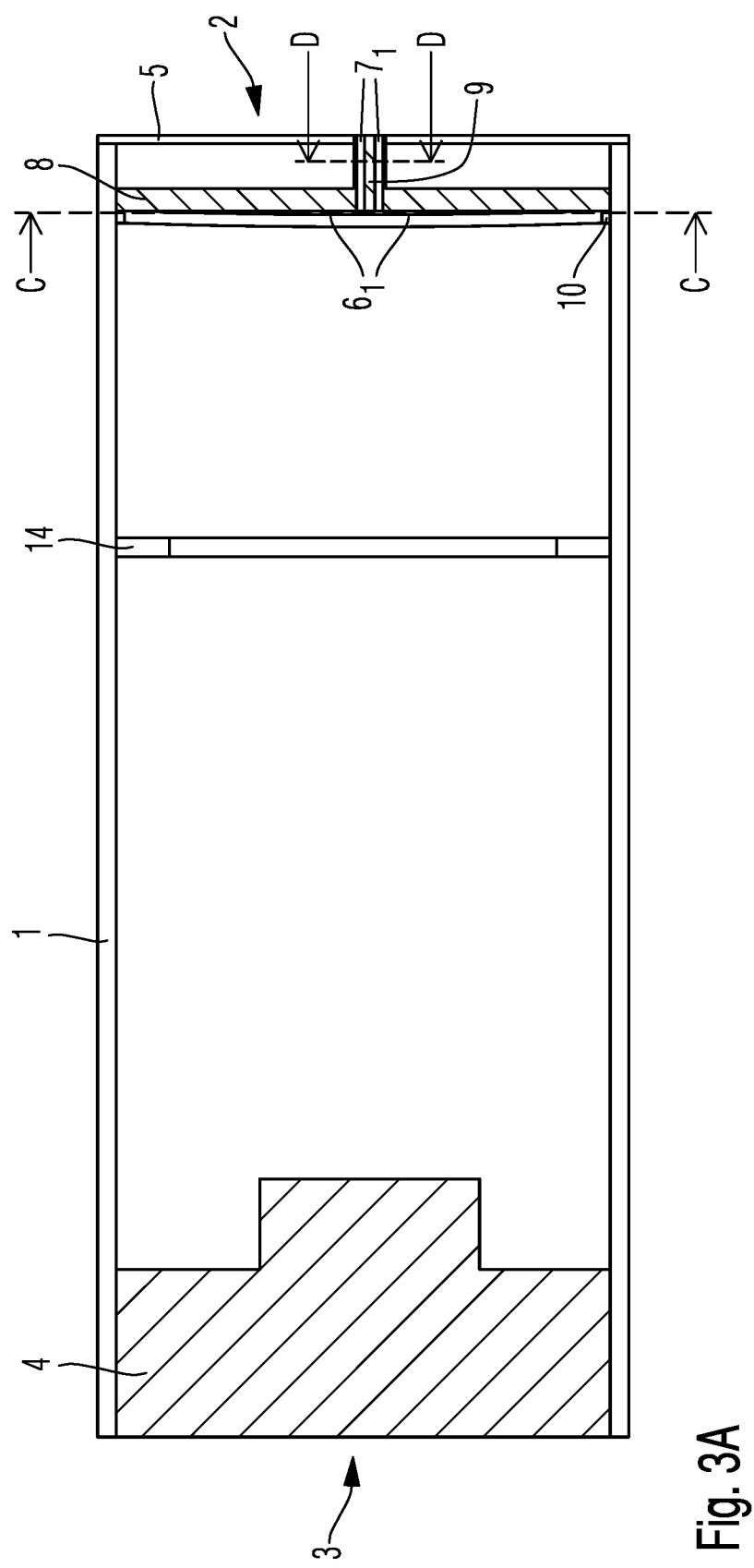
Figure 3B:
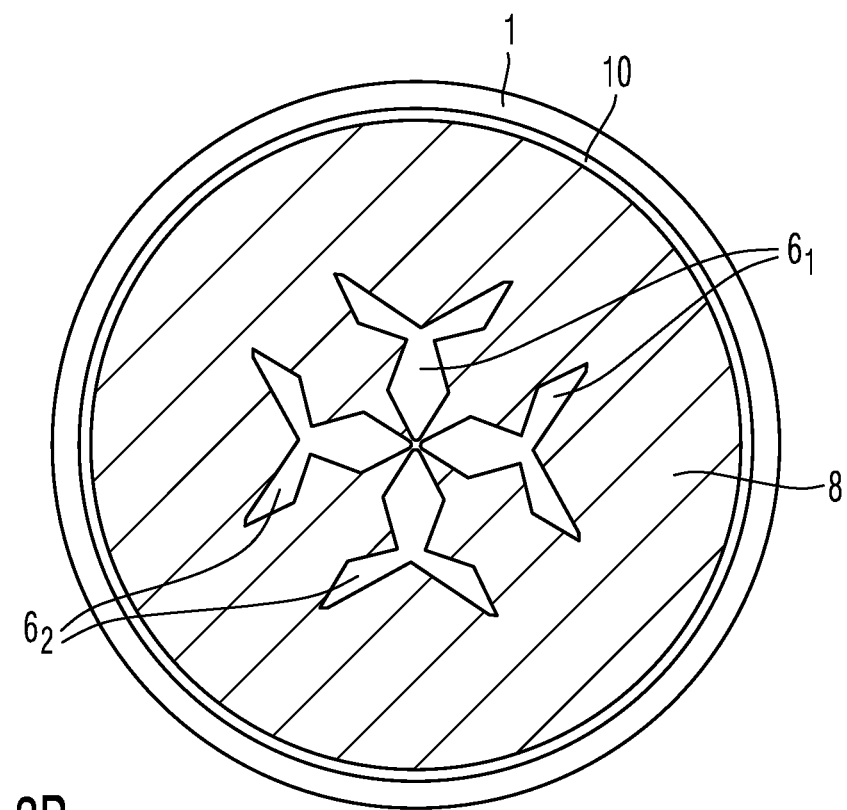
Figure 3C:
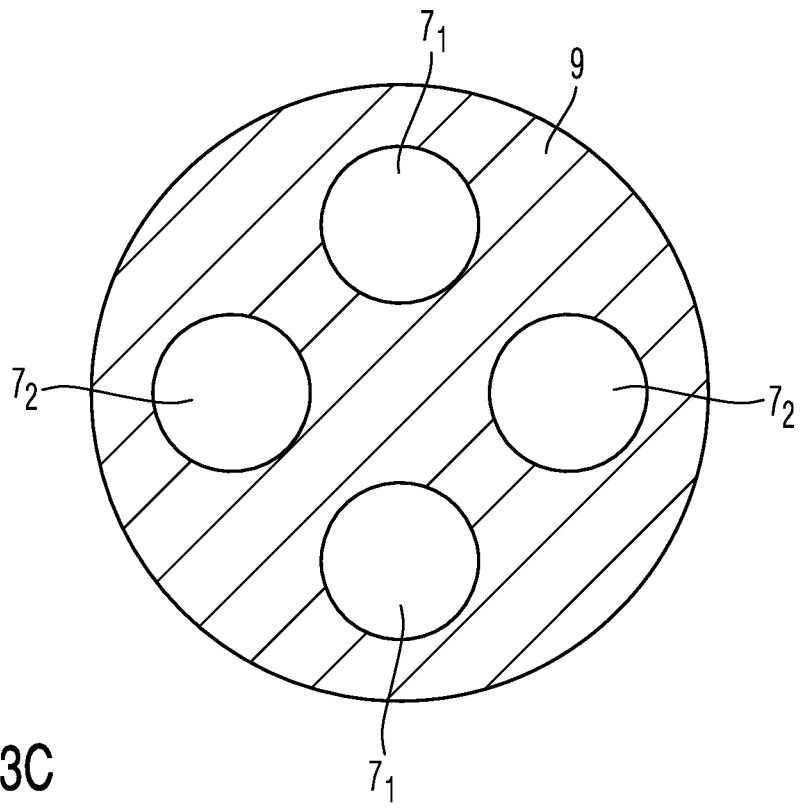
Figure 4A:
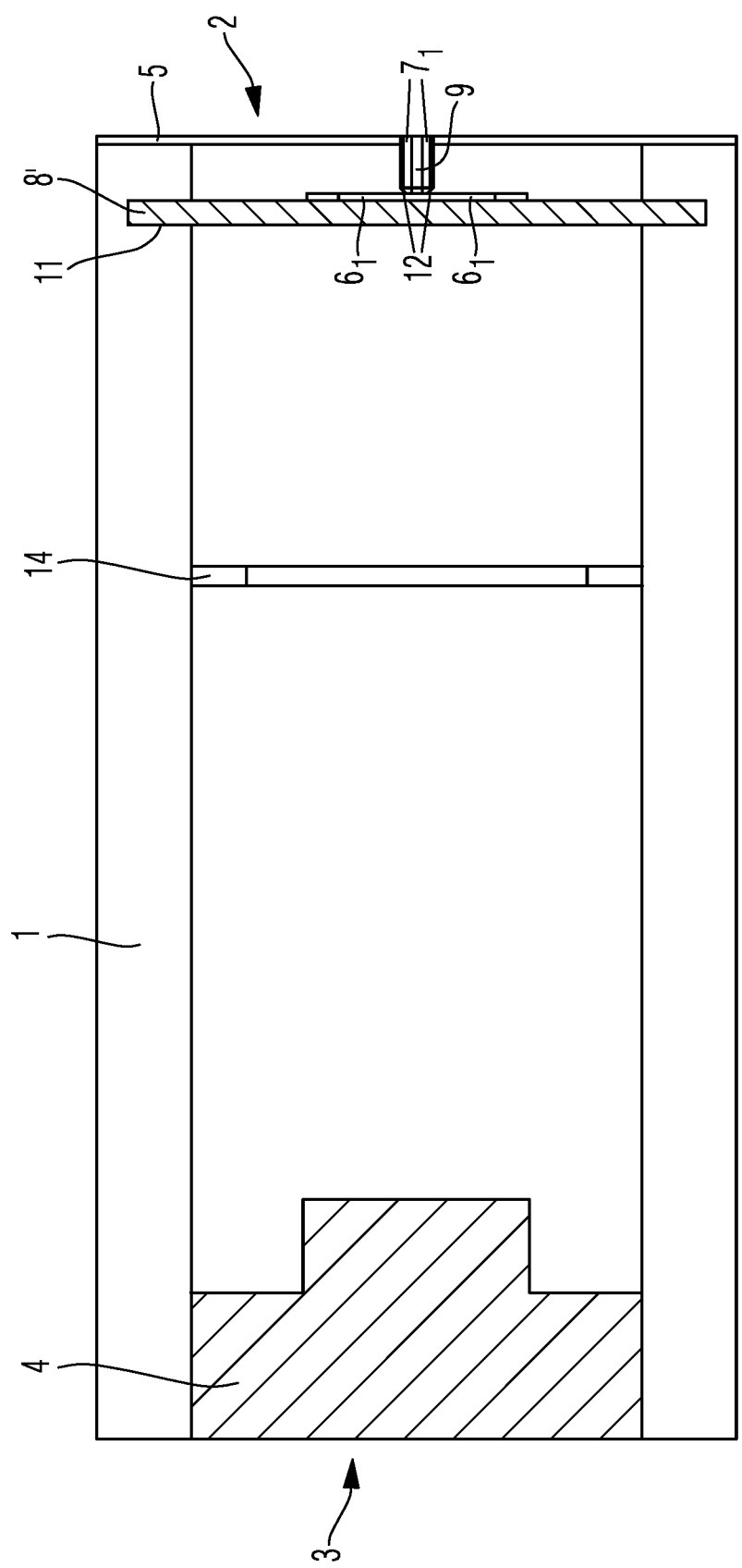
Figure 4B:
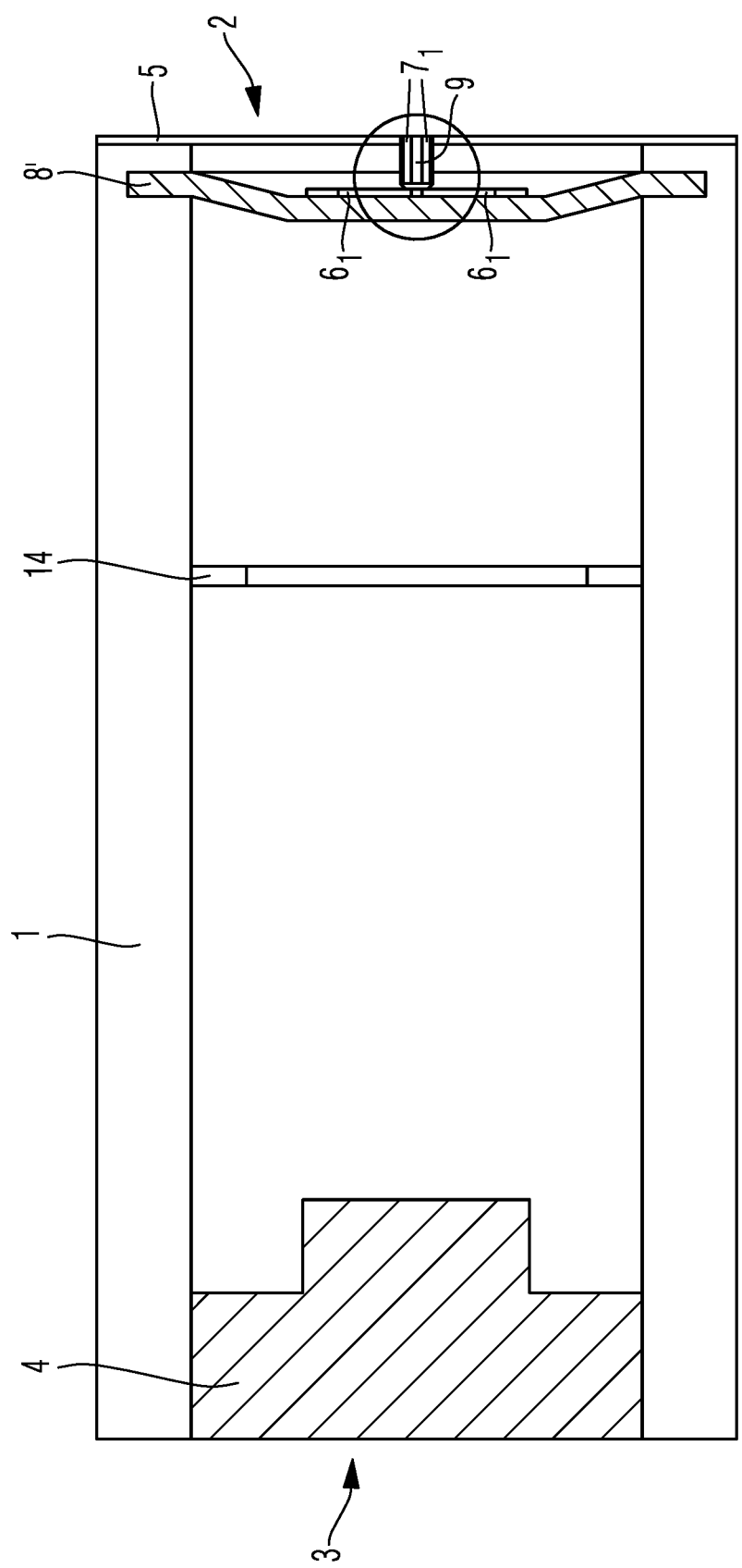
Figure 4C:
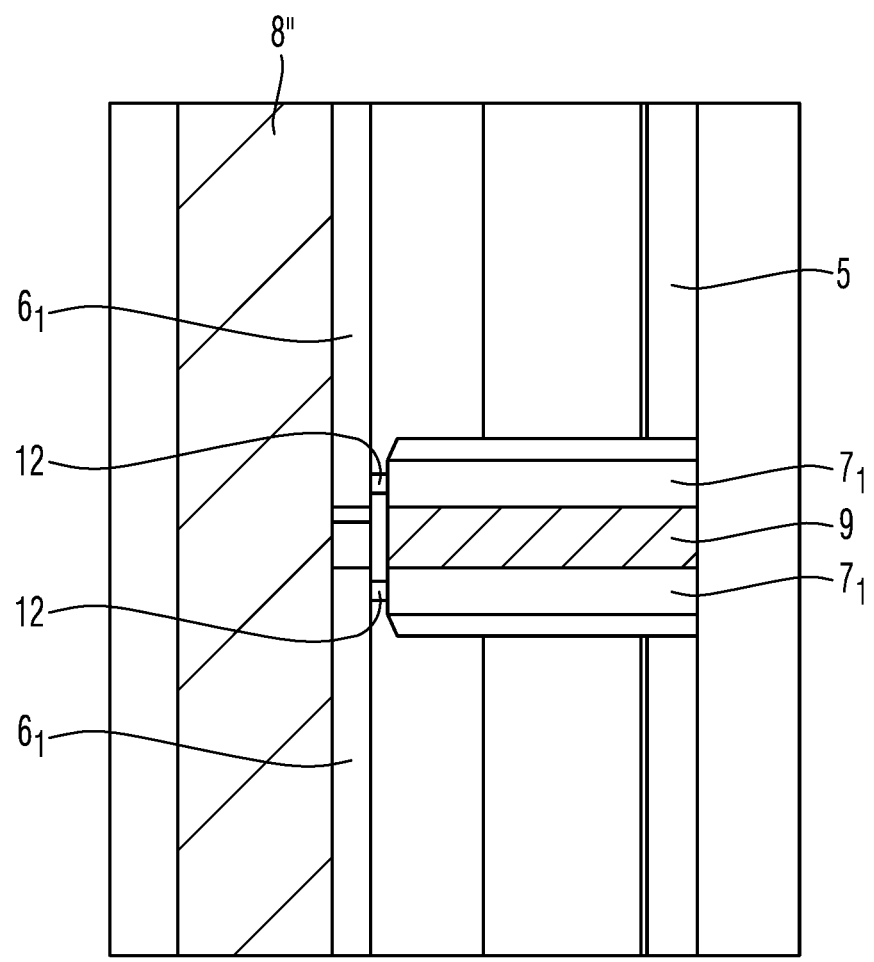
Figure 6:
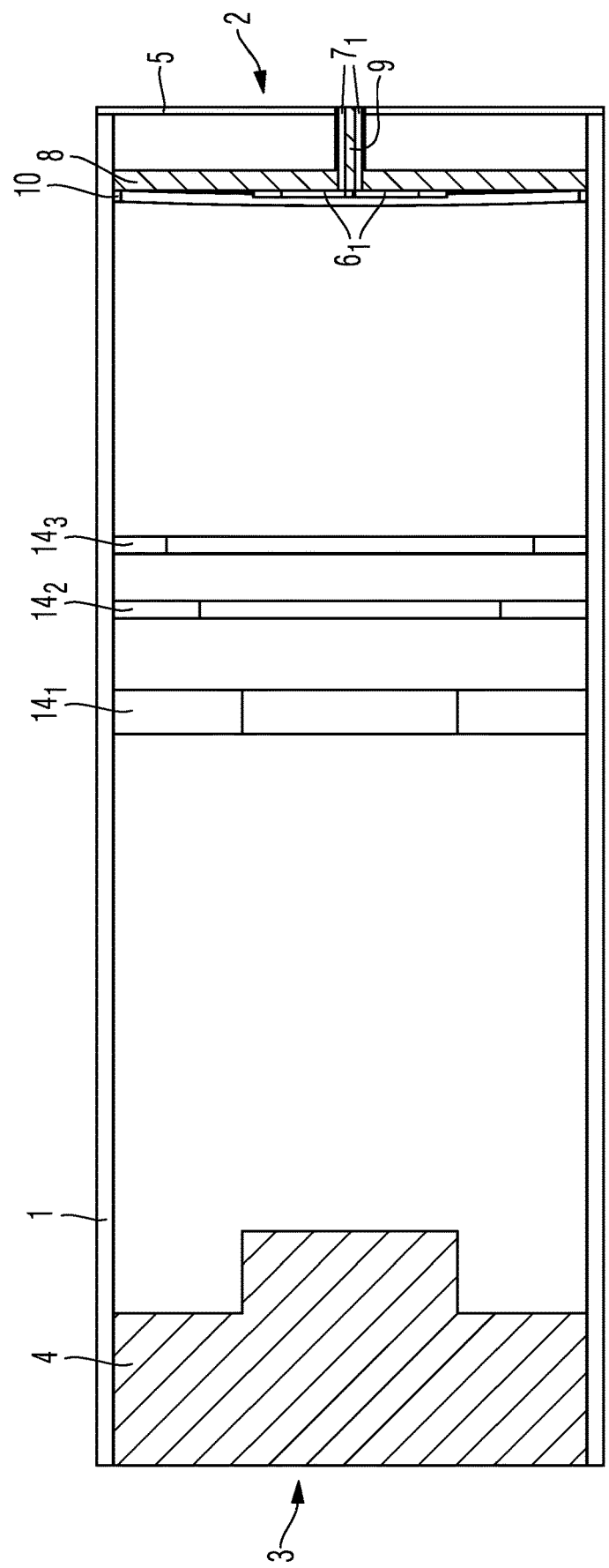
Figure 7:
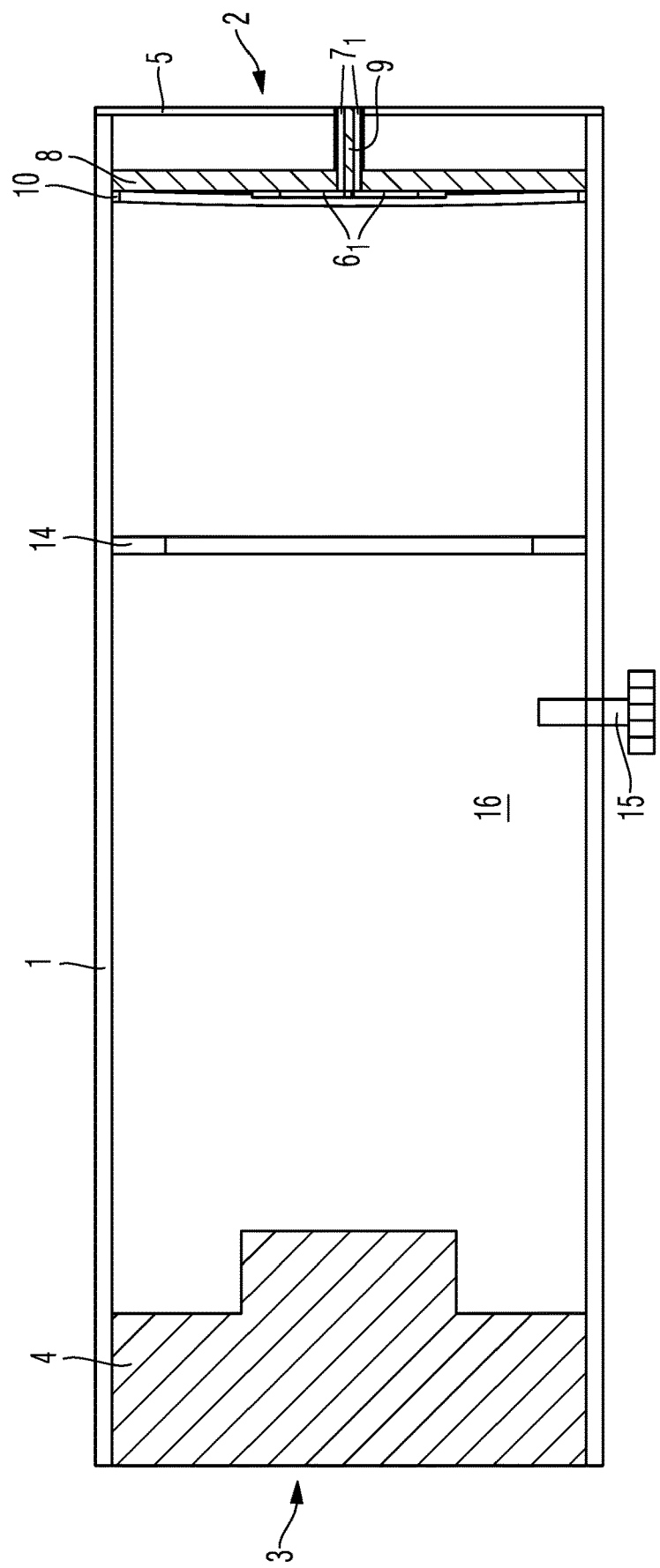
Figure 8:
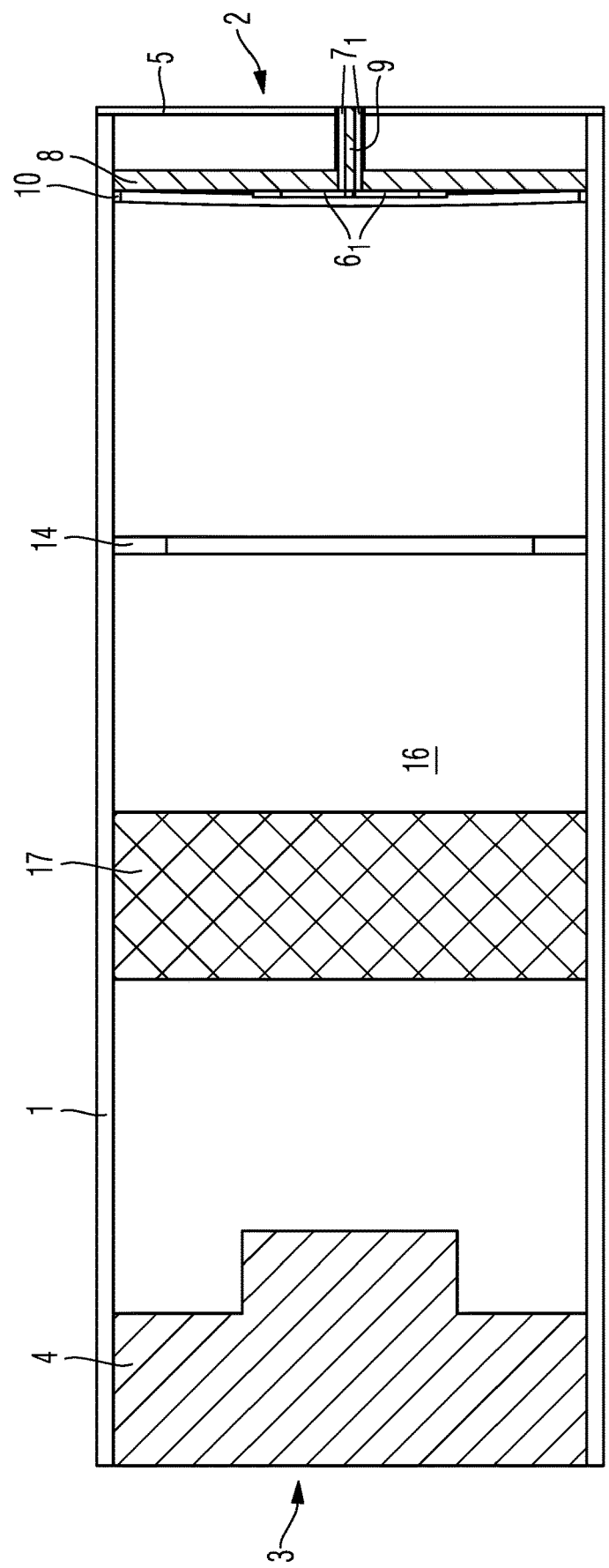
Figure 9A:
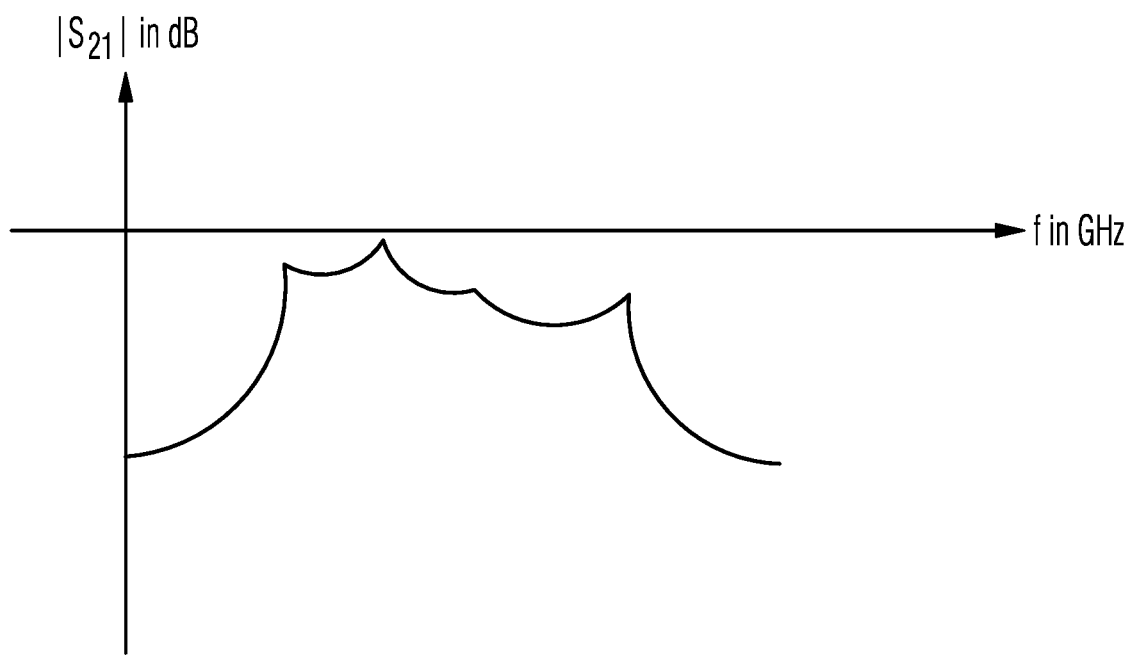
Figure 9B:
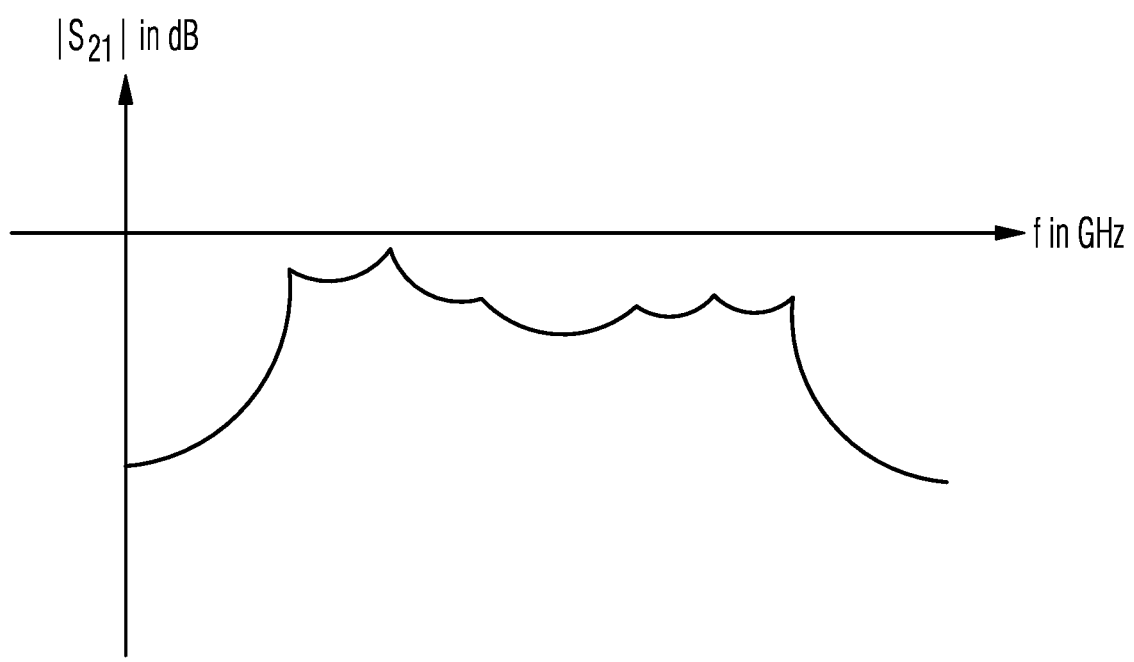

The present invention is explained in greater detail below on the basis of the exemplary embodiments indicated in the schematic figures of the drawing, in which:

FIG. 1 shows a three-dimensional illustration of a coupling and decoupling device according to the invention, FIG. 2A shows a cross-sectional illustration of a first subvariant of a first embodiment of the coupling and decoupling device according to the invention, FIG. 2B shows a cross-sectional illustration of the fractal dipole arrangement in the first subvariant of the first embodiment of the coupling and decoupling device according to the invention, FIG. 2C shows a cross-sectional illustration of the conductor pairs in the first subvariant of the first embodiment of the coupling and decoupling device according to the invention, FIG. 3A shows a cross-sectional illustration of a second subvariant of a first embodiment of the coupling and decoupling device according to the invention, FIG. 3B shows a cross-sectional illustration of the fractal dipole arrangement in the second subvariant of the first embodiment of the coupling and decoupling device according to the invention, FIG. 3C shows a cross-sectional illustration of the conductor pairs in the second subvariant of the first embodiment of the coupling and decoupling device according to the invention, FIG. 4A shows a cross-sectional illustration of a third subvariant of a first embodiment of the coupling and decoupling device according to the invention, FIG. 4B shows a cross-sectional illustration of a fourth subvariant of a first embodiment of the coupling and decoupling device according to the invention, FIG. 4C shows a cross-sectional illustration of an enlargement of the conductor pairs in the fourth subvariant of a first embodiment of the coupling and decoupling device according to the invention, FIG. 5 shows a cross-sectional illustration of a second embodiment of the coupling and decoupling device according to the invention, FIG. 6 shows a cross-sectional illustration of a third embodiment of the coupling and decoupling device according to the invention, FIG. 7 shows a cross-sectional illustration of a fourth embodiment of the coupling and decoupling device according to the invention, FIG. 8 shows a cross-sectional illustration of a further embodiment of the coupling and decoupling device according to the invention, FIG. 9A shows a spectral illustration of the transmission factor in the case of the first embodiment of the coupling and decoupling device according to the invention, and FIG. 9B shows a spectral illustration of the transmission factor in the case of a combination of the first and third embodiments of the coupling and decoupling device according to the invention.

The accompanying figures of the drawing are intended to convey a further understanding of the embodiments of the invention. They illustrate embodiments and in association with the description serve to clarify principles and concepts of the invention. Other embodiments and many of the advantages mentioned are evident in view of the drawings. The elements of the drawings are not necessarily shown in a manner true to scale with respect to one another.

In the figures of the drawing, identical, functionally identical and identically acting elements, features and components—unless stated otherwise—are provided in each case with the same reference signs.

The figures are described below in an interrelated and all-encompassing manner.

DESCRIPTION OF EXEMPLARY EMBODIMENTS

The individual embodiments and the individual subvariants of the coupling and decoupling device according to the invention are explained in detail below with reference to the figures of the drawing:

FIG. 1 shows a three-dimensional illustration of one preferred embodiment of the coupling and decoupling device according to the invention between a circuit carrier and a waveguide, preferably a dielectric waveguide.

The coupling and decoupling device is preferably realized with a hollow waveguide 1, which is preferably shaped in cylindrical fashion. Besides a cylindrical hollow waveguide 1 having a circular cross-sectional profile adapted to the circular cross-sectional profile of the dielectric waveguide, the invention concomitantly covers other cross-sectional profiles, too, for example rectangular, square or elliptic profiles. The hollow waveguide is preferably embodied in an integral fashion.

At a first lateral opening 2, the hollow waveguide 1 is coupled to a circuit carrier. At an opposite, second lateral opening 3, the hollow waveguide 1 is coupled to a waveguide 4, preferably a dielectric waveguide 4.

The circuit carrier can be either a monolayer printed circuit board or a multilayer printed circuit board. The printed circuit board is typically populated with customary elements or components appertaining to electronics, preferably radio-frequency electronics for transmitting and receiving a radio-frequency signal. Alternatively, the circuit carrier can also be a substrate in which corresponding electronics, preferably corresponding radio-frequency electronics, are integrated using monolithic or hybrid technology.

Both variants of a circuit carrier are mechanically fixed to the hollow waveguide 1 in the region of the first lateral opening 2 in each case using customary securing techniques, for example by means of screwing.

In one preferred embodiment of the invention, the circuit carrier is arranged in the region of the first lateral opening 2 of the hollow waveguide 1 such that an electrically conductive coating, preferably a metallic coating, on a surface of the circuit carrier facing the hollow waveguide 1 forms an electrically conductive layer 5 in the first lateral opening 2 of the hollow waveguide 1. Alternatively, the electrically conductive layer 5 in the first lateral opening 2 can also be a separate layer, or disk in the shape of a layer, detached from the circuit carrier. In this case, the circuit carrier is situated on a side of the electrically conductive layer 5 facing away from the hollow waveguide 1 in direct proximity to said electrically conductive layer 5.

The waveguide 4, preferably the dielectric waveguide 4, as is indicated in FIG. 1, is inserted into the hollow waveguide 1 preferably with an accurate fit in the second lateral opening 3. For impedance and field type matching between the waveguide 4 and the hollow waveguide 1, the end of the waveguide 4 facing the hollow waveguide 1, as is indicated by the step of the waveguide 4 in FIG. 1, is embodied as tapered in any technically practical form.

The two dipole antennas $6_1$ and $6_2$ are arranged in a region of the hollow waveguide 1 which is adjacent to the first lateral opening 2. The two dipole antennas $6_1$ and $6_2$ are arranged in a crossed manner and in an orthogonal orientation with respect to one another in each case in an identical axial position within the hollow waveguide 1. The two antenna arms of the two dipole antennas here are oriented in each case at a right angle with respect to the longitudinal axis of the hollow waveguide 1.

The two antenna arms of the two dipole antennas $6_1$ and $6_2$ are electrically and mechanically connected respectively to a conductor pair $7_1$ and $7_2$. Consequently, the two conductor pairs $7_1$ and $7_2$ in each case with their two individual conductors are likewise arranged in a crossed manner with respect to one another. The two conductor pairs $7_1$ and $7_2$ extend respectively from the two antenna arms of the two dipole antennas $6_1$ and $6_2$ as far as the associated contact surfaces on the circuit carrier.

As is evident from the cross-sectional illustration of the first subvariant of the first embodiment of the coupling and decoupling device according to the invention in FIG. 2A, both the two dipole antennas $6_1$ and $6_2$ and the associated conductor pairs $7_1$ and $7_2$ are led and arranged freely in the interior of the hollow waveguide 1.

The two dipole antennas $6_1$ and $6_2$, as is evident from FIG. 2B, are realized in each case as fractal dipole antennas. Each antenna arm here is realized in each case as a quadrilateral antenna surface in the form of a rhombus, which is extended in each case at one of its corners in each case by two further quadrilateral antenna surfaces. While the first-mentioned quadrilateral antenna surfaces in each case have a side length amounting to a quarter of the wavelength of the electromagnetic wave transmitted or received in each case in the dipole antenna $6_1$ and $6_2$, the side length of the respectively extended quadrilateral antenna surfaces corresponds to a wavelength reduced by a specific factor relative to half the wavelength. The number of iteration stages in the extension of each individual rectangular antenna surface in the fractal dipole antenna is not restricted to the factor one, but rather can include any desired, technically practical number of iteration stages. In each iteration stage, the bandwidth of the fractal dipole antenna is increased in each case in accordance with this specific factor. The iterative extension of each of the two dipole antennas $6_1$ and $6_2$ can also be effected, in so far as is technically practical, at a plurality of corners of the individual quadrilateral antenna surface. Finally, the iterative extension can also be present at one side line or at a plurality of side lines of the individual quadrilateral antenna surface. A square or arbitrarily shaped antenna surface can also be present instead of a rhombic antenna surface.

The crossed arrangement of the two conductor pairs $7_1$ and $7_2$ is evident from FIG. 2C, which conductor pairs enable a symmetrical feeding of each dipole antenna $6_1$ and $6_2$ with a respective associated differential radio-frequency signal or a symmetrical forwarding of the received differential radio-frequency signal. Analogously to the orthogonal arrangement of the two dipole antennas $6_1$ and $6_2$, the two conductor pairs $7_1$ and $7_2$ are likewise oriented orthogonally with respect to one another.

FIGS. 1 and 2A each show a ring-shaped stop directed radially inward on the inner casing surface of the hollow waveguide 1 in a region between the two dipole antennas $6_1$ and $6_2$ and the second lateral opening 3 of the hollow waveguide 1. Said ring-shaped stop directed radially inward is also explained in detail further below in the description of the third embodiment of the coupling and decoupling device according to the invention in accordance with FIG. 6.

The two dipole antennas $6_1$ and $6_2$ in each case transmit or receive a linearly polarized electromagnetic wave. On account of the orthogonal orientation of the two dipole antennas $6_1$ and $6_2$ in the hollow waveguide 1, the two transmitted electromagnetic waves have a mutually orthogonal plane of polarization. A dual polarized electromagnetic wave is generated given suitable feeding. Alternatively, at least one elliptically or circularly polarized electromagnetic wave can also be generated. Conversely a dual polarized electromagnetic wave, i.e. two linearly polarized electromagnetic waves having in each case mutually orthogonal planes of polarization, can be unambiguously received by the two dipole antennas $6_1$ and $6_2$. Alternatively, at least one elliptically or circularly polarized electromagnetic wave can also be received. Finally, the two dipole antennas $6_1$ and $6_2$ enable the unambiguous reception of a single linearly polarized electromagnetic wave, the plane of polarization of which is directed differently than the orientations of the two dipole antennas $6_1$ and $6_2$ or in the orientations of the two dipole antennas $6_1$ and $6_2$.

The frequency-dependent absolute value of the transmission factor $S_{21}$ of a coupling and decoupling device according to the invention, as illustrated in FIGS. 1 and 2A, has four maxima:

One maximum in the spectral profile of the absolute value of the transmission factor $S_{21}$ corresponds to the frequency of the dual polarized electromagnetic wave which is emitted by a dipole antenna arrangement that is not embodied in fractal fashion. By virtue of the fractal structure of the two dipole antennas $6_1$ and $6_2$, which was extended in each case only in a single iteration step, a further maximum is added in the spectral profile of the absolute value of the transmission factor $S_{21}$. A further maximum in the spectral profile of the absolute value of the transmission factor $S_{21}$ results from the ring-shaped stop directed radially inward, as is also explained in detail further below in the description concerning FIG. 6.

A fourth maximum in the spectral profile of the absolute value of the transmission factor $S_{21}$ results finally from the arrangement of the two dipole antennas $6_1$ and $6_2$ relative to the electrically conductive layer 5 in the first lateral opening 2 of the hollow waveguide 1.

The two metallic dipole antennas $6_1$ and $6_2$ together with the metallic layer 5 in the first lateral opening 2 form a capacitively acting geometry, which alters the transmission characteristic of the original hollow waveguide 1 given a corresponding geometric design and given a corresponding distance with respect to one another. Given a suitable design of the geometries and the distances of these elements mentioned—dipole antennas and metallic layer—a resonance at a resonant frequency which corresponds to the frequency of the fourth maximum in the spectral profile of the absolute value of the transmission factor $S_{21}$ can additionally be generated in the hollow waveguide 1.

In the design of the distance between the two dipole antennas $6_1$ and $6_2$ and the first lateral opening 2 of the hollow waveguide 1, it should be taken into consideration that said distance preferably has a value in accordance with equation (1). In this case, the electromagnetic wave emitted in each case by the two dipole antennas $6_1$ and $6_2$ in the direction of the first lateral opening 2 is constructively superimposed by the associated electromagnetic wave subjected to total internal reflection at the metallic layer 5. The directional characteristic of the antenna arrangement is additionally improved in this way.

A further subvariant—a second subvariant—of the first embodiment of the coupling and decoupling device according to the invention is evident from FIGS. 3A, 3B and 3C:

In the case of the second subvariant, the two dipole antennas $6_1$ and $6_2$ are arranged and secured on a carrier membrane 8 at least with their two antenna arms oriented orthogonally with respect to the longitudinal axis of the hollow waveguide 1. Here and hereinafter a carrier membrane is understood to mean a plate-shaped body produced from a dielectric material and having two lateral surfaces. The dielectric material is a rigid material in the case of the second subvariant of the invention. One of the two lateral surfaces serves here for the arrangement and for the securing of the two dipole antennas $6_1$ and $6_2$.

In the second subvariant, the arrangement of the two dipole antennas $6_1$ and $6_2$ on the carrier membrane 8 is effected either on the lateral side of the carrier membrane 8 which is directed in the direction of the first lateral opening 2 of the hollow waveguide 1, or on the lateral side of the carrier membrane 8 which is directed in the direction of the second lateral opening 3 of the hollow waveguide 1. The carrier membrane 8 is usually produced from a dielectric material, for example FR4 or silicon oxide. The securing of the two dipole antennas $6_1$ and $6_2$ on the carrier membrane 8 can be effected here using customary manufacturing technologies, for example by means of construction technology or adhesive bonding.

In the second subvariant, the two conductor pairs $7_1$ and $7_2$ are led axially through the carrier membrane 8 if the dipole antennas are applied on the lateral surface of the carrier membrane 8 which is directed in the direction of the second lateral opening 3 of the hollow waveguide 1. For better guidance of the two conductor pairs $7_1$ and $7_2$ in the hollow waveguide 1, the two individual conductors of the two differential conductor pairs $7_1$ and $7_2$, as is evident from FIG. 3C, in particular, are inserted in a signal line 9 composed of a suitable dielectric material. The individual conductors of the two differential conductor pairs $7_1$ and $7_2$ are additionally mechanically stabilized as a result of their being inserted into the insulation material of the signal line 9 by virtue of the outer diameter of the signal line 1 being adapted to the inner diameter of the axial feedthrough in the carrier membrane 8 or in the metallic layer 5. By comparison with the first subvariant, the dielectric signal line 9 in the second subvariant enables a better electrical insulation of the two conductor pairs $7_1$ and $7_2$ vis-à-vis the metallic layer 5.

In the second subvariant, the mechanical fixing of the carrier membrane 8 to the hollow waveguide 1 is effected by way of at least one web 10 which is shaped on the inner surface of the hollow waveguide 1 and against which the carrier membrane butts with its lateral surface. For this purpose, the axial extent of the signal line 9 is designed in such a way that the signal line 9, which is connected to the contact surfaces of the circuit carrier and at the same time to the dipole antennas $6_1$ and $6_2$ and thus to the carrier membrane 8, exerts a sufficient contact pressure from the carrier membrane 8 on the at least one web 10. The at least one web 10 can be embodied as a single ring-shaped web or as a combination of a plurality of webs extending in each case over an angle segment of the hollow waveguide 1.

In the second subvariant, the distance between the two dipole antennas $6_1$ and $6_2$ and the first lateral opening 2 of the hollow waveguide 1 should likewise preferably be designed in accordance with equation (1).

In the second subvariant of the first embodiment, the relative permittivity of the dielectric material of the carrier membrane 8' and of the signal line 9 should be taken into consideration in the design of the resonant frequency for the fourth maximum in the spectral profile of the absolute value of the transmission factor $S_{21}$.

In the third subvariant of the first embodiment of the coupling and decoupling device according to the invention, the carrier membrane 8' is clamped in between two partial regions of the hollow waveguide 1 in a radial depression 11, preferably a depression in the shape of a groove, on the inner casing surface of the hollow waveguide 1. For this purpose, the carrier membrane 8' of the third subvariant, as is evident from FIG. 4A, is lengthened relative to the carrier membrane 8 of the second subvariant. This lengthening of the carrier membrane 8' and the associated radial depression 11 should preferably be designed in accordance with equation (1). Specifically, an electromagnetic wave emitted radially in each case by the two dipole antennas $6_1$ and $6_2$ is subjected to total internal reflection at the radial end of the radial depression 11. In this way, the electromagnetic wave subjected to total internal reflection completely compensates for the radially emitted electromagnetic wave. Consequently, the directional characteristic of the antenna arrangement is additionally optimized by means of this technical measure.

In the third subvariant in accordance with FIG. 4A, the two dipole antennas $6_1$ and $6_2$ are arranged and secured on a lateral surface of the carrier membrane 8' which is directed in the direction of the first lateral opening 2 of the hollow waveguide 1. In this way, the two conductor pairs $7_1$ and $7_2$ or a signal line 9 containing the two conductor pairs $7_1$ and $7_2$ need no longer be led through the carrier membrane 8'. The carrier membrane 8' of the third subvariant, just like the carrier membrane 8 of the second subvariant, is produced from a rigid dielectric material. The two conductor pairs $7_1$ and $7_2$ press with their lateral heads 12 against the associated antenna regions of the two dipole antennas $6_1$ and $6_2$ in each case in such a way that a sufficient electrical and mechanical contact arises between the antenna arms of the two dipole antennas $6_1$ and $6_2$ and the associated conductor pairs $7_1$ and $7_2$.

The two opposite lateral sides of the groove 11 provided in the hollow waveguide 1 for clamping in the carrier membrane 8', together with the dielectric material of the lengthened carrier membrane 8', alter the transmission characteristic of the original hollow waveguide 1. The radial extent of the groove 11 provided in the hollow waveguide 1 for clamping in the carrier membrane 8' additionally changes the transmission characteristic of the original hollow waveguide 1. By means of a suitable geometric design of the groove 11 and by means of a suitable choice of the dielectric material of the carrier membrane 8', according to the invention it is thus possible to generate an additional resonance at a further resonant frequency which leads to a further maximum, a fifth maximum, in the spectral profile of the absolute value of the transmission factor $S_{21}$. An additional increase in the bandwidth of the coupling and decoupling device according to the invention is possible in this way.

A fourth subvariant of the first embodiment of the coupling and decoupling device according to the invention is evident from FIGS. 4B and 4C:

In the fourth subvariant, the two dipole antennas $6_1$ and $6_2$, as in the third subvariant, are arranged and secured on the lateral surface of the carrier membrane 8" which is directed in the direction of the first lateral opening 2 of the hollow waveguide 1. The two conductor pairs $7_1$ and $7_2$, which are respectively in contact with the two antenna arms of the two dipole antennas $6_1$ and $6_2$ and with the associated contact surface of the circuit carrier, are thus not led through the carrier membrane 8".

The carrier membrane 8" of the third subvariant is produced from an elastic dielectric material. The axial extent of the two conductor pairs $7_1$ and $7_2$ and of the signal line 9 is chosen such that the individual conductors of the two conductor pairs $7_1$ and $7_2$ press with their lateral heads 12 against the associated antenna regions of the two dipole antennas $6_1$ and $6_2$ in each case in such a way that the elastic carrier membrane 8" is deformed. In this case, the carrier membrane 8" assumes a concave shaping, preferably a trough-shaped shaping, in the direction of the second lateral opening 3. In this case, the dipole antennas $6_1$ and $6_2$ can become located in the region of the trough bottom of the trough-shaped shaping of the carrier membrane 8" if a comparatively rigid material is used for the dipole antennas $6_1$ and $6_2$. With the use of a comparatively elastic material for the two dipole antennas $6_1$ and $6_2$, the two dipole antennas $6_1$ and $6_2$ can at least partly also lie in the region of the trough walls of the trough-shaped shaping of the carrier membrane 8".

In a second embodiment of the coupling and decoupling device according to the invention, the hollow waveguide has a plurality of regions $13_1$, $13_2$, $13_3$ and $13_4$ between the two dipole antennas $6_1$ and $6_2$ and the second lateral opening 3 of the hollow waveguide 1, said regions each having an associated inner diameter, an associated axial extent and an associated distance with respect to the two dipole antennas $6_1$ and $6_2$. The three parameters of inner diameter, axial extent and distance with respect to the dipole antennas can differ completely or only partly among the individual regions $13_1$, $13_2$, $13_3$ and $13_4$.

By means of a suitable parameterization of the inner diameter and the axial extent in the respective region, the capacitively and inductively acting geometry in the respective region can be changed relative to the capacitively and inductively acting geometry of the original hollow waveguide 1. In this way, for each of said regions $13_1$, $13_2$, $13_3$ and $13_4$ it is possible to generate in each case an additional resonance at the associated resonant frequency in the hollow waveguide 1. These additional resonances with the associated resonant frequencies lead in each case to additional maxima in the spectral profile of the absolute value of the transmission factor $S_{21}$ at these resonant frequencies. The bandwidth of the coupling and decoupling device according to the invention can advantageously be additionally extended in this way.

In a third embodiment of the coupling and decoupling device according to the invention in accordance with FIG. 6, at least one ring-shaped stop $14_1$, $14_2$ and $14_3$ directed radially inward, preferably a plurality of ring-shaped stops $14_1$, $14_2$ and $14_3$ directed radially inward, is shaped on the inner casing surface of the hollow waveguide 1 between the two dipole antennas $6_1$ and $6_2$ and the second lateral opening 3 of the hollow waveguide 1. A partial reflection of the electromagnetic wave emitted in the direction of the second lateral opening 3 occurs in each case at the stops.

The individual stops each have an associated radial extent, an associated axial extent and an associated axial distance with respect to the stop shaped in each case the most closely adjacently in the direction of the first lateral opening 2, or with respect to the two dipole antennas $6_1$ and $6_2$. Consequently, each individual stop $14_1$, $14_2$ and $14_3$, by way of its associated radial and axial extent, alters the capacitively acting geometry of the original hollow waveguide 1 within its associated axial extent. Moreover, each individual stop $14_1$, $14_2$ and $14_3$ alters the inductively acting geometry of the hollow waveguide 1 by way of its axial distance with respect to the most closely located stop or with respect to the two dipole antennas $6_1$ and $6_2$.

By means of a suitable dimensioning of the parameters of radial extent, axial extent and axial distance, according to the invention, for each individual stop $14_1$, $14_2$ and $14_3$, it is thus possible to generate in each case an additional resonance at the associated resonant frequency in the hollow waveguide 1.

These additional resonances with the associated resonant frequencies likewise lead respectively to additional maxima in the spectral profile of the absolute value of the transmission factor $S_{21}$ at these resonant frequencies. The bandwidth of the coupling and decoupling device according to the invention can advantageously be additionally extended in this way.

In a fourth embodiment of the coupling and decoupling device according to the invention in accordance with FIG. 7, at least one electrically conductive element 15, preferably at least one metallic element 15, is arranged on the inner casing surface of the hollow waveguide 1 between the second lateral opening 3 and the two dipole antennas $6_1$ and $6_2$. Said electrically conductive element 15, on the inner casing surface of the hollow waveguide 1, projects into the interior 16 of the hollow waveguide 1 and is spaced apart at an associated axial distance from the two dipole antennas $6_1$ and $6_2$.

The electrically conductive element 15 can be a rotationally symmetrical body, for example a screw as in FIG. 7 or a pin, or a parallelepipedal body, for example a plate or a lamina, or an arbitrarily shaped body. The securing of said electrically conductive element 15 to the hollow waveguide 1 is effected by known securing techniques, for example by means of screwing. The radial extent of the electrically conductive element 15 can either be constant or be adjustable in a variable manner by means of a corresponding motor mechanism.

The electrically conductive element 15, by way of its associated geometry and its axial distance with respect to a further electrically conductive element or with respect to the two dipole antennas $6_1$ and $6_2$, alters the capacitively and the inductively acting geometry of the original hollow waveguide 1. In this way, given corresponding shaping and positioning of each individual electrically conductive element 15, with each individual electrically conductive element 15 it is possible to achieve in each case an associated filtering effect on the transmission behavior of the hollow waveguide 1. In this case, both the respective filter type—high-pass filter, bandpass filter or band-stop filter—and the associated filter parameters—center frequency, bandwidth or cut-off frequency—can be adjusted in each case.

In a further configuration of the coupling and decoupling device according to the invention in accordance with FIG. 8, a component 17 for conversion between at least one elliptically polarized electromagnetic wave and at least one linearly polarized electromagnetic wave is inserted, preferably with an accurate fit, in the interior 16 of the hollow waveguide 1. Said component 17 for conversion is preferably positioned between the second lateral opening 3 and all stops 14, $14_1$, $14_2$ and $14_3$ respectively provided in the hollow waveguide 1.

Said component 17 for conversion between at least one elliptically polarized electromagnetic wave and at least one linearly polarized electromagnetic wave preferably carries out a phase shift between two linearly polarized electromagnetic waves with a magnitude of 90° on the basis of a different effective permittivity in two mutually orthogonal directions. In this way, a phase offset of 90° can advantageously be realized, which is required for generating an elliptically or circularly polarized electromagnetic wave from at least one linearly polarized electromagnetic wave. This requirement occurs if the two linearly polarized electromagnetic waves have to be transmitted or received by the antenna arrangement phase-synchronously.

From the comparison of the spectral representations of the absolute value of the transmission factor $S_{21}$ in FIGS. 9A and 9B, two further maxima are discernible in FIG. 9B by comparison with FIG. 9A. These two additional maxima are attributable to the two additional stops in FIG. 6, which in each case achieve an additional resonance at an associated resonant frequency. This shows that by means of a suitable selection and a suitable combination of the presented embodiments of the coupling and decoupling device according to the invention and by means of a suitable dimensioning of these individual embodiments, the bandwidth of the coupling and decoupling device according to the invention and thus the bandwidth of the dual polarized electromagnetic wave transmitted in the coupling and decoupling device according to the invention can advantageously be increased.

Although the present invention has been described completely above on the basis of preferred exemplary embodiments, it is not restricted thereto, but rather can be modified in diverse ways.

LIST OF REFERENCE SIGNS

1 Hollow waveguide
2 First lateral opening
3 Second lateral opening
4 Waveguide
5 Electrically conductive layer
$6_1$, $6_2$ Dipole antenna
$7_1$, $7_2$ Conductor pair
8, 8', 8" Carrier membrane
9 Signal line
10 Web
11 Groove
12 Head
$13_1$, $13_2$, $13_3$, $13_4$ Region
14, $14_1$, $14_2$, $14_3$ Stop
15 Electrically conductive element
16 Interior
17 Component for conversion between at least one elliptically polarized electromagnetic wave and at least one linearly polarized electromagnetic wave

The invention claimed is:

1. A coupling system, comprising:
a first dipole antenna;
a second dipole antenna that crosses and is orthogonal to said first dipole antenna;
a first waveguide;
an electrically conductive layer; and
a dielectric element selected from the group consisting of a dielectric plate, a dielectric membrane and an elastic dielectric element, wherein
said first waveguide is substantially tubular,
said first dipole antenna and said second dipole antenna are situated within said first waveguide,
said electrically conductive layer substantially covers a first opening at a first end of said first waveguide, and
said dielectric element is securely supported within said first waveguide via a peripheral region of said dielectric element.

2. The coupling system of claim 1, wherein:
in a plane cross-sectioning said first waveguide, said dielectric element occupies substantially an entirety of an interior of said first waveguide.

3. The coupling system of claim 1, wherein:
at least one of said first dipole antenna and said second dipole antenna abuts said dielectric element.

4. The coupling system of claim 1, comprising:
a second, dielectric waveguide, wherein
in a plane cross-sectioning a second opening at a second end of said first waveguide, said portion of said second waveguide occupies substantially an entirety of an interior of said first waveguide.

5. The coupling system of claim 1, wherein:
said first waveguide comprises a slit that, over a full circumference of an interior wall of said first waveguide, extends a depth d into said interior wall, and
said dielectric element extends into and substantially fills an entirety of said slit.

6. The coupling system of claim 1, comprising:
a circuit board; and
a plurality of feedlines, wherein
said plurality of feedlines extends from said circuit board to said first/second dipole antenna in a direction substantially parallel to a longitudinal axis of said first waveguide.

7. The coupling system of claim 6, wherein:
said dielectric element is an elastic dielectric element, and
said plurality of feedlines and at least one of said first dipole antenna and said second dipole antenna are situated between said circuit board and said elastic dielectric element such that said circuit board exerts a force on said plurality of feedlines that exert respective forces on at least one of said first dipole antenna and said second dipole antenna that deforms said elastic dielectric element.

8. The coupling system of claim 6, wherein:
said circuit board is situated adjacent said electrically conductive layer.

9. The coupling system of claim 6, wherein:
said electrically conductive layer is situated intermediate said circuit board and each of said first dipole antenna and said second dipole antenna.

10. The coupling system of claim 1, wherein:
at least one of said first dipole antenna and said second dipole antenna is an antenna selected from the group consisting of a patch antenna, a fractal antenna and a fractal patch antenna.

11. The coupling system of claim 1, wherein:
said first dipole antenna is coplanar to said second dipole antenna.

12. The coupling system of claim 1, wherein:
said first waveguide comprises a first region having a first inner diameter and a second region having a second inner diameter that differs from said first inner diameter.

13. The coupling system of claim 1, comprising:
at least one aperture that reduces an inner diameter of said first waveguide.

14. The coupling system of claim 1, comprising:
a ledge that projects inwardly from an interior wall of said first waveguide, wherein
a portion of said dielectric element abuts said ledge.

15. The coupling system of claim 1, wherein:
said first dipole antenna comprises a first conductive structure and a second conductive structure,
said second dipole antenna comprises a third conductive structure and a fourth conductive structure,
a first imaginary straight line along an axis of symmetry of each of said first conductive structure and said second conductive structure orthogonally crosses a second imaginary straight line along an axis of symmetry of each said third conductive structure and said fourth conductive structure,
said first conductive structure and said second conductive structure are on opposite sides of said second imaginary straight line, and
said third conductive structure and said fourth conductive structure are on opposite sides of said second imaginary straight line.

16. The coupling system of claim 1, comprising:
a first feedline and a second feedline that constitute a first conductor pair that feeds said first dipole antenna; and
a third feedline and a fourth feedline that constitute a second conductor pair that feeds said second dipole antenna, wherein
a third imaginary line from said first feedline to said second feedline crosses a fourth imaginary line from said third feedline to said fourth feedline, said third imaginary line and said fourth imaginary line being in a plane parallel to said electrically conductive layer.

17. The coupling system of claim 16, wherein:
said first feedline electrically contacts a first conductive structure of said first dipole antenna, said second feedline electrically contacts a second conductive structure of said first dipole antenna, said third feedline electrically contacts a third conductive structure of said second dipole antenna, and said fourth feedline electrically contacts a fourth conductive structure of said second dipole antenna.

18. The coupling system of claim 1, wherein:
at least one of said first dipole antenna and said second dipole antenna is situated intermediate said electrically conductive layer and said dielectric element.

19. A coupling system, comprising:
a first dipole antenna;
a second dipole antenna that crosses and is orthogonal to said first dipole antenna;
a waveguide;
an electrically conductive layer;
a dielectric element selected from the group consisting of a dielectric plate, a dielectric membrane and an elastic dielectric element;
a circuit board; and
a plurality of feedlines, wherein
said waveguide is substantially tubular,
said first dipole antenna and said second dipole antenna are situated within said waveguide,
said plurality of feedlines extends from said circuit board to said first/second dipole antenna in a direction substantially parallel to a longitudinal axis of said waveguide,
said electrically conductive layer substantially covers a first opening at a first end of said waveguide,
said dielectric element is supported within said waveguide via a peripheral region of said dielectric element,
said dielectric element is an elastic dielectric element, and
said plurality of feedlines and at least one of said first dipole antenna and said second dipole antenna are situated between said circuit board and said elastic dielectric element such that said circuit board exerts a force on said plurality of feedlines that exert respective forces on at least one of said first dipole antenna and said second dipole antenna that deforms said elastic dielectric element.

20. A coupling system, comprising:
a first dipole antenna;
a second dipole antenna that crosses and is orthogonal to said first dipole antenna;
a waveguide;
an electrically conductive layer;
a dielectric element selected from the group consisting of a dielectric plate, a dielectric membrane and an elastic dielectric element;
a circuit board, wherein
said waveguide is substantially tubular,
said first dipole antenna and said second dipole antenna are situated within said waveguide,
said electrically conductive layer substantially covers a first opening at a first end of said waveguide,
said dielectric element is supported within said waveguide via a peripheral region of said dielectric element, and
said electrically conductive layer is situated intermediate said circuit board and each of said first dipole antenna and said second dipole antenna.

* * * * *